(12) United States Patent
Rennich

(10) Patent No.: US 10,346,507 B2
(45) Date of Patent: Jul. 9, 2019

(54) SYMMETRIC BLOCK SPARSE MATRIX-VECTOR MULTIPLICATION

(71) Applicant: Nvidia Corporation, Santa Clara, CA (US)

(72) Inventor: Steve Rennich, Belmont, CA (US)

(73) Assignee: Nvidia Corporation, Santa Clara, CA (US)

(*) Notice: Subject to any disclaimer, the term of this patent is extended or adjusted under 35 U.S.C. 154(b) by 0 days.

(21) Appl. No.: 15/795,091

(22) Filed: Oct. 26, 2017

(65) Prior Publication Data

US 2018/0121388 A1    May 3, 2018

Related U.S. Application Data

(60) Provisional application No. 62/416,077, filed on Nov. 1, 2016.

(51) Int. Cl.
   *G06F 17/16*    (2006.01)
   *G06F 17/12*    (2006.01)
   *G06F 7/78*     (2006.01)

(52) U.S. Cl.
   CPC ............... *G06F 17/16* (2013.01); *G06F 7/78* (2013.01); *G06F 17/12* (2013.01)

(58) Field of Classification Search
   None
   See application file for complete search history.

(56) References Cited

U.S. PATENT DOCUMENTS

| 7,672,818 | B2  |   | 3/2010 | Watts, III |                      |
|-----------|-----|---|--------|------------|----------------------|
| 8,380,778 | B1  | * | 2/2013 | Bell       | G06F 17/16   708/520 |
| 9,063,882 | B1  |   | 6/2015 | Zhao       |                      |
| 9,697,176 | B2  |   | 7/2017 | Daga et al.|                      |
| 2007/0198621 | A1 | * | 8/2007 | Lumsdaine | G06F 17/16   708/200 |
| 2014/0108481 | A1 | * | 4/2014 | Davis     | G06F 17/16   708/607 |
| 2016/0179574 | A1 | * | 6/2016 | Merrill, III | G06F 7/523   718/106 |
| 2018/0121388 | A1 | * | 5/2018 | Rennich   | G06F 17/16           |

* cited by examiner

*Primary Examiner* — David H Malzahn

(57) ABSTRACT

Embodiments of the present invention are directed to methods and systems for performing block sparse matrix-vector multiplications with improved efficiency through the use of a specific re-ordering the matrix data such that matrix symmetry can be exploited while simultaneously avoiding atomic memory operations or the need for inefficient memory operations in general. One disclosed method includes reordering the matrix data such that, for any column of non-transpose data, and for any row of transpose data simultaneously processed within a single thread-block on a GPU, all matrix elements update independent elements of the output vector. Using the method, the amount of data required to represent the sparse matrix can be reduced by as much as 50%, thereby doubling the effective performance on the GPU, and doubling the size of the matrix that can be accelerated by the GPU.

24 Claims, 7 Drawing Sheets

Exemplary Computer System 500

Exemplary Computer System 600

SYMMETRIC BLOCK SPARSE MATRIX-VECTOR MULTIPLICATION

CROSS-REFERENCE TO RELATED APPLICATIONS

This application claims the benefit of and priority to the provisional patent application Ser. No. 62/416,077, entitled "BLOCK SPARSE MATRIX-VECTOR MULTIPLICATION," with filing date Nov. 1, 2016, and hereby incorporated by reference in its entirety.

TECHNICAL FIELD

Embodiments of this invention relate generally to performing calculations on large complex linear systems in a computing device. More specifically, embodiments of the claimed invention are directed at iterative solvers for complex systems of linear equations on Graphics Processing Units (GPUs).

BACKGROUND

Modern computers have long been utilized to perform large, complex calculations. Recently, the parallel processing capabilities of graphics processing units (GPUs) have been increasingly leveraged to perform computations for extremely large linear systems in a wide variety of computational science applications, such as applications that perform motion calculation, collision detection, 3D graphical rendering, structural analysis, and discretized physics in general, etc. As technology continues to develop, the ability to solve such systems faster, and/or solve increasingly larger systems efficiently is a persistent objective.

There are several computational approaches (e.g., algorithms) which can be applied to solve large linear systems of equations. Generally, these approaches can be classified as either direct or iterative methods. Typically, the time to solution for iterative methods scales at a lower rate than direct methods, so as the problem size increases, iterative methods become increasingly advantageous. The Sparse Matrix-Vector multiplication (SpMV) operation is a central component of iterative methods, often occupying the bulk of the computational cost of the algorithm and determining the overall time to solution.

SpMV is the operation y=Ax, where y and x are dense vectors of length n, and A is a sparse matrix. The SpMV operation is typically computationally light, achieving, for the case of double-precision computation, about 1 flop (floating-point operation) for every 4-6 bytes of data. Consequently, the SpMV operation is what is considered "bandwidth bound". The performance of the operation is not determined by the speed of the arithmetic, but rather, by the speed at which data can be delivered from main memory to the processing unit(s). Optimizations for bandwidth-bound operations involve caching as much data as possible and caching data as close to the processors as possible to minimize overall communication time. When implemented on an accelerator (e.g., a GPU), with each thread computing a single element (or contribution to a single element) of y, the result y can be efficiently stored in registers, and the input x can be stored in a cache (e.g., due to its frequent re-use in the system, commonly texture cache or similar). However, the size of the data in the sparse matrix A is typically much larger than x or y, depending on the average number of non-zeroes per row in A, and is used only once during the SpMV operation. As such, there is little or no opportunity for caching in these cases.

The performance of SpMV on the GPU-equipped system depends on the bandwidth and size of the 'device' memory (also known as 'GMEM' or 'global' memory, the largest memory space on the GPU, independent of other memory spaces: shared/constant/texture/L1/etc.). The bandwidth of the GPU memory determines how fast elements of the sparse matrix A can be communicated to the computational cores, and strongly influences the overall speed of the SpMV operation. The size of the device memory determines how much of the matrix A can be stored on the GPU. If matrix A is too large to fit entirely on the GPU, then a portion of matrix A remains in the central processing unit (CPU) memory and does not benefit from GPU acceleration, which reduces the speed of the overall SpMV. Even when sparse matrix A can be fully stored in GPU memory, a small portion of sparse matrix A can be stored in host memory such that the total SpMV operation can occur on both the CPU and the GPU simultaneously, and leverage the combined performance of the CPU and GPU.

Linear systems arising from computational physics—used for example, in collision detection, motion, and other applications of discretized physics that are common in graphical processing—typically result in block sparse matrices. A block sparse matrix is a matrix that is defined using smaller matrices, called blocks. Block sparse refers to sparse matrices where the non-zero entries occur, at least partially, as small dense matrices (e.g., typically dense matrices having a size of 3×3 or 6×6), within the sparse matrix (typically of size thousands to millions or larger).

In many systems of interest, the matrix A is either symmetric or partially symmetric such that the numerical entries are mirrored across the diagonal (i.e. $a\_i,j = a\_j,i$). For these matrices, it is possible to transfer or store half of the matrix data and still perform the full SpMV operation. The other half of the matrix data may be calculated as the transpose of the half that is stored. While this technique allows significantly larger matrices to be stored, leveraging the symmetry results in very slow performance in all currently known implementations of SpMV on the GPU. This is, at least in part, because a single element of A now contributes (via its transpose) to two output elements of y, and the thread handling that element of A must now atomically update both values. Atomic updates are necessary in this case because a different threads may be updating the same y values simultaneously and atomic operations are required to avoid a race condition. Atomic operations are generally much less performant than their non-atomic counterparts which hurts performance.

When an SpMV is performed on a GPU, a set of threads multiply a dense column segment of x by a portion of the matrix A. Typically threads are assigned to a row of A. For the non-transpose portion of this computation, the calculation is straightforward: each thread updates its component of y. However, when computing the contribution of the transpose of the column segment, it becomes a row segment, and all threads must update the same element of y, hence the need to use atomics, or other strategies.

Consecutive entries in a dense column segment (for a 'column-major' matrix storage format) must be read simultaneously by a group of threads in a thread block to maximize device memory performance (which limits SpMV performance) by achieving 'coalesced' memory access, and similarly for 'row-major' or other standard storage formats. It is very inefficient for threads to randomly access individual words. Consequently, an efficient SpMV must maintain 'coalesced' memory access.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

This invention is a method to leverage symmetry in the A matrix to reduce the size of a symmetric matrix, A, such that less memory is required to store A and less time is required to communicate A from device memory to the processing units, permitting both faster solutions and the ability to accelerate larger problems. Embodiments of the present invention are directed to methods and systems for performing vector calculations for block sparse matrices with improved efficiency by allocating portions of a sparse matrix between processors in a computing system. In particular, block sparse matrix vector calculations are improved over contemporary solutions by reducing the amount of data transferred from the device memory in a GPU to the streaming multi-processors in the GPU.

According to a first aspect, a linear system represented as a sparse matrix and an input vector is received. The size of available memory in a graphics processing unit is determined and an appropriately sized portion of the block sparse matrix is stored in the memory of the GPU, with the remainder of the block sparse matrix, if any, being stored in the memory of the underlying computing system and accessible to a CPU (or other general purpose processor) of the computing system. According to one embodiment, the sparse matrix is represented as a block sparse matrix, such that non-zero elements in the matrix are grouped into small dense clusters (e.g., smaller grids).

Embodiments of the present invention rearrange the x, y, and A data, and store this data in a combination of registers and shared memory to minimize the amount of data required to be stored/communicated, while also eliminating the need for atomics and maintaining maximum bandwidth (fully utilized cache lines, 'coalesced' memory access, etc.). In one exemplary embodiment, performing vector calculations for block sparse matrices includes storing/transferring only the symmetric half of the A matrix in block form. The data from dense blocks of A are read directly into registers, the contribution to the output vector y from the non-transposed data is accumulated, per thread, in registers, the contribution to the output vector y of the transposed data is accumulated in shared memory, and the final result is generated by summing the results in registers with the results in shared memory.

According to other embodiments, steps a through d are only applied to dense blocks positioned sufficiently close to the diagonal such that the output elements corresponding to the transpose were contained in the relatively limited amount of shared memory accessible to the thread block. In still other embodiments, enhanced inter-block thread synchronization and communication enables symmetric treatment of arbitrarily positioned dense blocks.

According to a second embodiment of the invention, a computing device is provided with a GPU. In one or more embodiments, the GPU comprises a global memory, and, a plurality of streaming multi-processor cores (SMs). Each SM in turn may be equipped with one or more instruction units (IUs), stream processors (SPs), and shared memory that is shared among the SPs of the SM. Multiplication operations are performed for a sparse matrix that is stored in the memories of the GPU.

In one or more embodiments, a linear system represented as a sparse matrix and an input vector is received in the GPU. Portions of an output vector corresponding to a multiplication operation of the block sparse matrix with the input vector are stored in registers and the shared memories of the SMs of the GPU. The block sparse matrix in the global memory of the GPU is re-arranged to prevent any need for atomic updates. Specifically, the values for successive rows are stored in a column offset by a constant from the immediately preceding row, such that the values of a column prior to re-arrangement cascade along a diagonal.

According to another embodiment of the invention, for sparse matrices that are larger than the size of the global memory of the GPU, an appropriately sized portion of the matrix is stored in the GPU with the remaining portion allocated in the main memory (e.g., RAM) of the computing device and performed by the CPU (or other general purpose processor). The portions of the sparse matrix are thereafter calculated in the GPU (as described above) and CPU simultaneously before being combined, to leverage the enhanced processing capabilities of the GPU without limiting the size of the block sparse matrix to the size of the GPU's memory.

For each of the aspects described above, by storing the output vector directly into registers or shared memory of the SMs, the time normally required to commit the output to the global memory of the GPU can be saved (thereby completing the operations faster). Specifically, leveraging symmetry for the SpMV operation has the potential to both increase the speed of the computation and increase the maximum size of the computation by up to a factor of 2.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
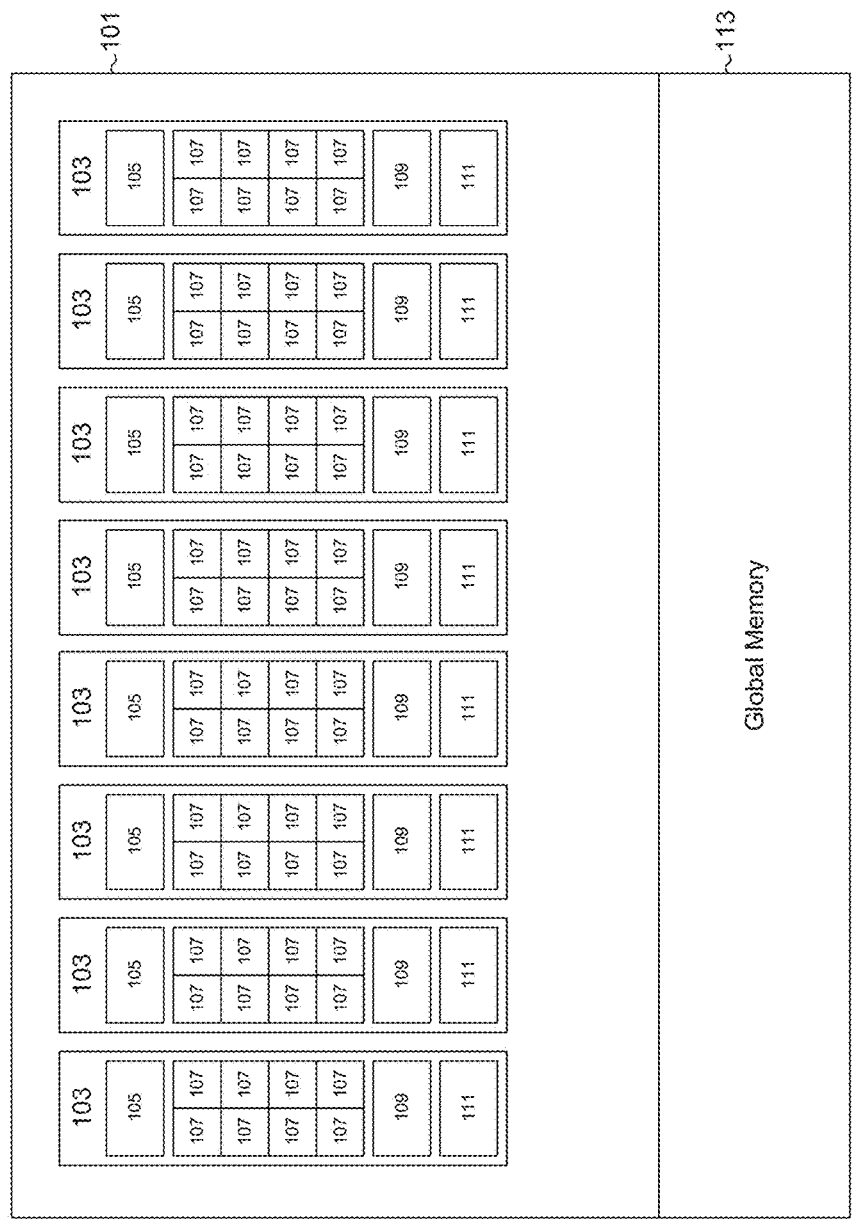
FIG. 1 depicts an exemplary block diagram of the components in a multi-core graphics processing unit, in accordance with an embodiment of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is directed to methods and systems for performing sparse matrix vector calculations with improved efficiency by allocating portions of a sparse matrix between processors in a computing system. In particular, block sparse matrix vector calculations are improved over contemporary solutions by reducing the amount of data transferred from the global memory in a graphics processing unit (GPU) to the shared memory and/or streaming multi-processors in the GPU. This situation arises frequently during fine element analysis (FEA) operations, and during modeling of discretized physics, where every node in a mesh calculation for example contributes a certain number of dense blocks.

Exemplary Processing Environment

FIG. 1 depicts exemplary components in a multi-core processing unit 100 upon which various embodiments of the present invention may be executed, in accordance with an embodiment of the present invention. As presented in FIG. 1, a multi-core processing unit 100 is implemented as a graphics processing unit (GPU) 101 that includes a plurality of multi-core processors (SM) 103. Each SM 103 may consist of one or more instruction units 105, multiple stream processors (SPs) 107, one or more special function units (SFUs) 109 and a shared memory device 111 that is shared between the SPs 107 of the SM 103. Additionally, GPU 101 may include device memory 113 that is shared between all SMs 103. Optionally, each SM 103 may also include one or more caches and registers which may be included in, or separate from the shared memory device 111.

In one or more embodiments, GPU 101 may be configured to process as a stream processor, processors that can operate in parallel by running one kernel (function) on many elements in a stream of records at once. As depicted in FIG. 1, the SPs 107 of an SM 103 execute the same kernel instructions issued by the instruction unit (105). TSPs 107 within an SM 103 are capable of communicating quickly through the shared memory device 111 of the SM. However, since a shared memory device 111 is typically of very limited size, it may not be suitable for larger collections of data.

In one or more embodiments, the output vector may be separated into a plurality of portions, with one or more portions being stored in a shared memory device 111 of an SM 103. According to one or more further embodiments, the specific portion of the output vector stored in a shared memory device 111 of an SM 103 corresponds to the output of the matrix block allocated to that SM 103. This configuration allows the GPU to concurrently process multiple blocks (in multiple threads) across the multiple SMs 103 (in multiple SPs 107), in parallel, with intermediate (local) results of the individual SPs being stored in registers (as a register vector for example). When the processing is complete, the register vectors may be combined with the data in the output vector portions to obtain the final result.

Writing directly to the shared memory device 111 presents a far more time-efficient method for storing data than accessing the device memory 113 of the GPU 101, which is limited by a bandwidth shared between all other SMs 103, since the shared memory device 111 may be used as a buffer to collect intermediate contributions calculated during updating of an output vector with the transpose of a matrix.

Because shared memory device 111 is still shared between the SPs 107 on one SM 101, atomic updates may produce conflicts when more than one SP is reading and/or writing from the same address in the shared memory device 111. The limited size of the shared memory device 111 limits the amount of the matrix that may be treated symmetrically. For symmetric blocks which lie sufficiently close to the diagonal of the block sparse matrix, they need not be stored in its entirety in device memory 113 (and thus, also do not need to be transferred to the SMs) and can instead be stored as a half portion. When each thread is assigned to a row of A, in a non-transposed dense block, a column of the dense block does not share any output elements. However, in the transpose, each element of the column, which is now a row, all contribute to the same element in y—necessitating atomics. As such, the elements are skewed so that no elements of the non-transposed column contribute to the same element of the output vector, y, in either the non-transpose or the transpose case, to prevent collisions during atomic updates.

Figure 2:
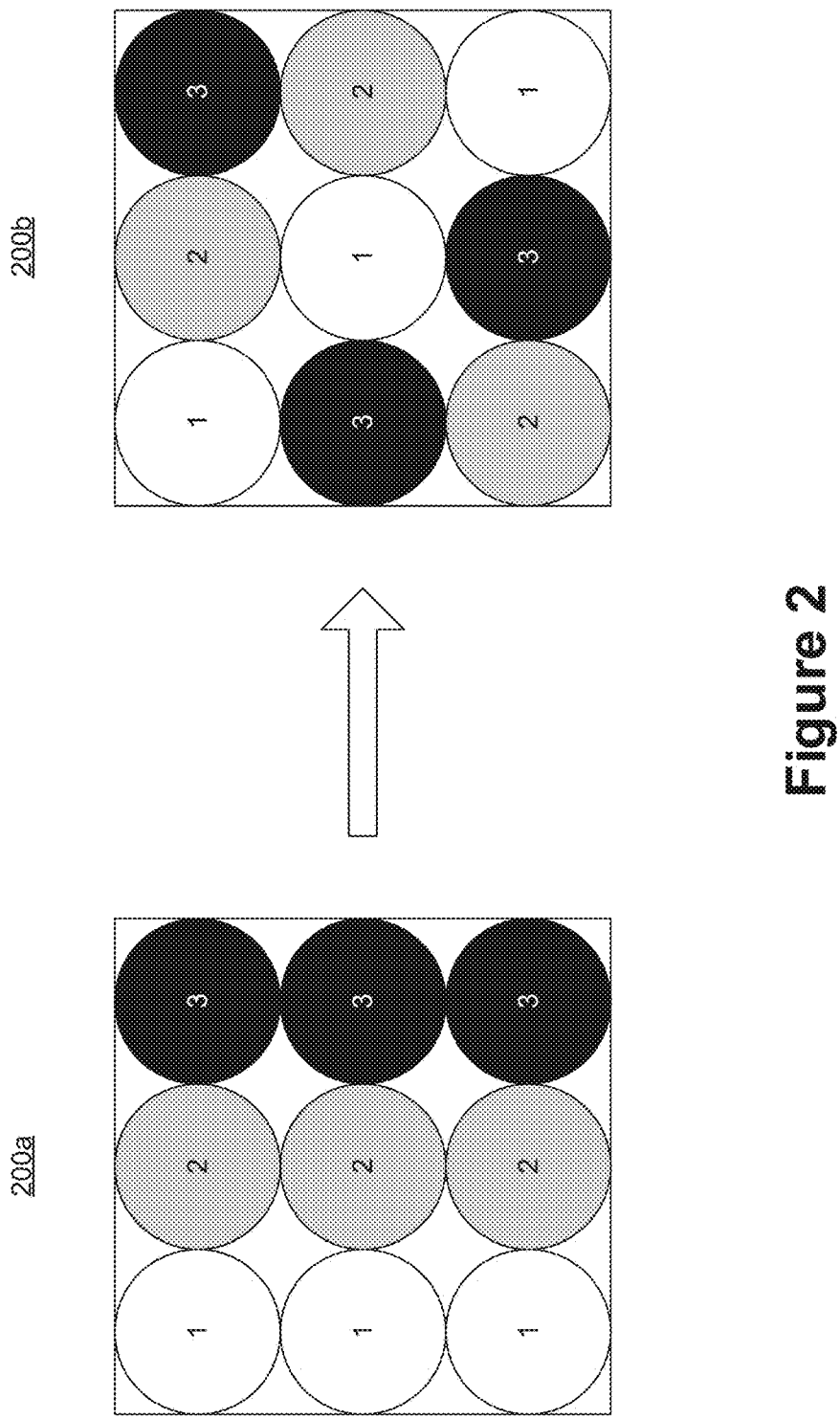
FIG. 2 depicts a re-arrangement of an exemplary portion of a matrix block, in accordance with various embodiments of the present invention

FIG. 2 depicts an exemplary 3×3 matrix block. As depicted in FIG. 2, an increasing offset may be applied to the rows to the elements of the original matrix block 200a to produce the adjusted matrix block 200b. Circles with the same number represent transpose values which would be stored in the same element in the output vector. As can be seen in FIG. 2, elements arranged in the columns of original matrix block 200a are increasingly offset such that the values for successive rows are stored in a column offset (by 1) from the immediately preceding row. Since (typically) all processors in an SP of a streaming multi-processor SM can be considered to execute instructions simultaneously, the three SPs that are traversing the block 200a by columns would update the contributions from each column simultaneously. For the transpose case this would lead to collisions in shared memory and would normally require atomic updates. In contrast, there are no repeated colors in the columns of matrix block 200b, and would therefore eliminate the need for atomic updates to avoid possible collisions in either the transpose or the non-transpose case.

As depicted in FIG. 2 for example, the values in the second row in the original matrix block 200a are each skewed by one column in the resultant adjusted matrix block 200b, such that the value in column 1 of the second row (labeled as "1") is re-positioned to be in the second column of that row, with the other values in that row being similarly offset by one column to the right, with the final column value wrapping around to the first column. Likewise, the values in the third row of the original matrix block 200a are skewed by two columns in the adjusted matrix block 200b. In this way, processing threads executed by stream processors (e.g., SP 107 of FIG. 1) can process the adjusted block matrix 200b with each row being processed by a separate SP, without requiring an atomic update to an address in a shared memory device that may also be subsequently written to. The processors SP in a streaming multiprocessor SM execute instructions simultaneously. For example, the three SPs that are traversing the block 200a in FIG. 2 by columns updates the contributions from each column simultaneously. Since block 200a has the same colors in each column, these values lead to collisions in shared memory and would require atomic updates. There are no repeated colors in the columns of block 200b (corresponding to transpose rows) so there are no collisions and atomic updates are not required.

Figure 3:
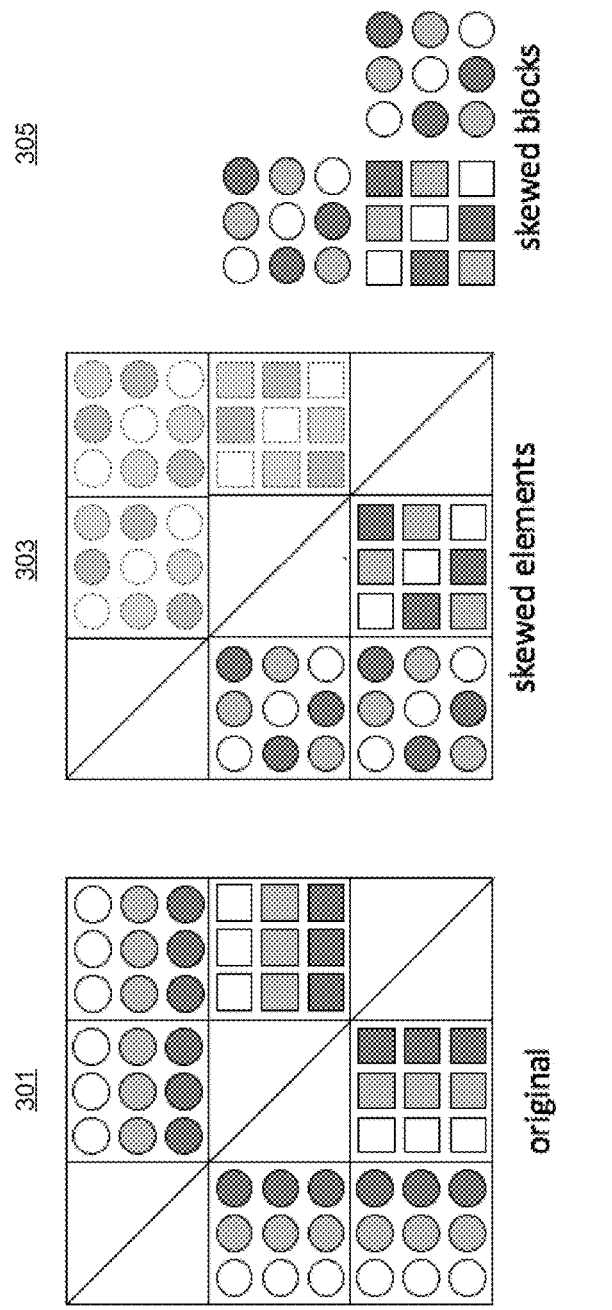
FIG. 3 depicts a re-arrangement of an exemplary sparse symmetric matrix, in accordance with various embodiments of the present invention.

FIG. 3 depicts re-arrangements of an exemplary block sparse symmetric matrix in accordance with various embodiments of the present invention. As depicted in FIG. 3, the exemplary block sparse matrix is depicted at three different iterations, with matrix 301 representing the original matrix, matrix 303 representing the matrix after the dense block elements are skewed, and matrix 305 representing how the matrix blocks are re-arranged. As depicted in FIG. 3, the greyed-out data in matrix 303 is symmetric and does not need to be stored.

As depicted in FIG. 3, the combination of color and shape indicates the transpose row. For example, the white circles transpose to row 1. A streaming multi-processor advances column by column, and the elements in column 1 are processed simultaneously before moving to column 2, etc. The matrix 305 has no repeated "transpose rows" in any column (no repeated colors/shapes). When processing a column from the data on the right, there are no collisions in the transpose data. As such, atomics are not required. Under these exemplary conditions, matrix 303 contains repeating shapes within columns, and matrix 301 contains repetitions of both color and shape. However, by offsetting the elements in each block, as well as offsetting the blocks, as depicted in the right (305) matrix, such repetition can be avoided.

It must be noted for clarity that rearranging the way the matrix data is stored affects the order in which the mathematical operations are performed, but does not imply that different mathematical operations are performed. For example, the dark-grey circles in figure 3.00-0005, for the non-transpose case still multiply the $3^{rd}$ element of the vector x, regardless of where they appear, just like they would using the standard interpretation of figure 3.00-0001. As the way the data is skewed in figure 3.00-0005 is regular, the BSpMV code can easily determine the proper value of x with which to perform the multiplication in both the non-transpose and transpose cases.

Figure 4A:
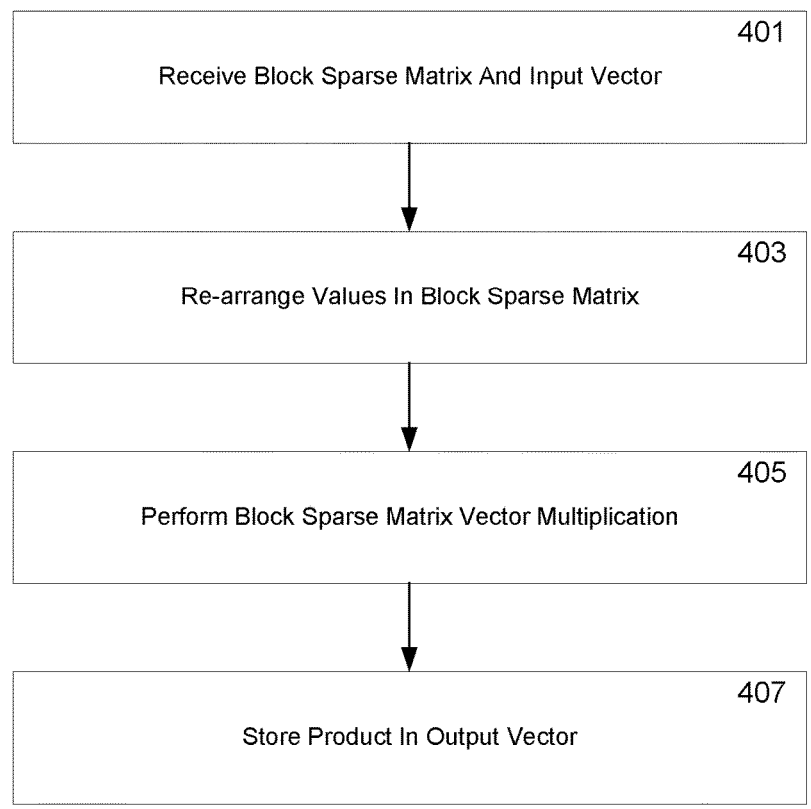
FIG. 4A depicts a flow diagram of an exemplary process for performing block sparse matrix vector multiplication, in accordance with various embodiments of the present invention.

FIG. 4A depicts a flow chart 400 of an exemplary process for performing block sparse matrix vector operations in a GPU. Steps 401-407 of FIG. 4A describe exemplary steps of the flowchart 400 in accordance with the various embodiments herein described.

At step 401, a sparse matrix and an input vector is received. In one or more embodiments, the sparse matrix is a block sparse matrix with non-zero values condensed into dense blocks. In still further embodiments, the block sparse matrix is a symmetric matrix wherein values are distributed such that the values of the matrix are symmetric with respect to the main diagonal of the matrix. In one or more embodiments, the block sparse matrix and input vector may be stored in a global memory (e.g., device memory 113) of a GPU. Alternately, for a block sparse matrix that is larger than the size of the global memory of the GPU, a portion of the block sparse matrix of sufficient size to fit within the global memory may be stored in the global memory, with the remainder being stored in a general memory device (e.g., RAM) of a host computing system.

According to one or more embodiments, the block sparse matrix may be rearranged as a plurality of matrix blocks that represent smaller portions (e.g., grids or components) of the non-zero values in the block sparse matrix. One or more of these matrix blocks in turn may be assigned to SMs of the GPU in a thread block, with the threads in the thread block being processed concurrently and in parallel (albeit separately) by individual SPs of the SMs. A thread block is a programming abstraction that represents a group of threads that can be executing serially or in parallel.

At step 403, the values in the block sparse matrix are re-arranged. Values can be re-arranged, for example, by skewing the data for matrix blocks processed concurrently in the same SM such that matrix blocks do not share column values corresponding to the same address in an output vector with other matrix blocks being concurrently processed. For symmetric matrix blocks, matrix blocks may also be re-arranged such that they do not share row values with the transpose of a matrix block that is concurrently processed. According to one or more embodiments, the values in a matrix block of the block sparse matrix can be re-arranged by applying an increasing offset to each row of the matrix block, wherein the values in the row are shifted over by one or more columns.

At step 405, the block sparse matrix vector (BSpMV) multiplication operations are performed. According to one or more embodiments, the operations may include calculating a (dot) product of a matrix block with the input vector, or portions thereof. BSpMV operations may be performed concurrently on a plurality of threads in one or more of SPs of one or more of SMs.

Output from the operations may be stored at step 407 in an output vector. In one or more embodiments, the output vector may be separated into a plurality of portions, with one or more portions being stored in registers and/or the shared memory of an SM. According to further embodiments, the specific portion stored in the shared memory of an SM corresponds to the output of the matrix blocks assigned to that SM to be processed. For iterative processes, according to some embodiments, the matrix A (or a portion of it) stays on the GPU between successive BSpMV operations, and the matrix A is used to multiply a relatively large number of x vectors.

Once all operations are completed by the SMs of the GPU, the portions of the output vector may be combined to derive the (entire) output of the BSpMV multiplication. For embodiments wherein only a portion of the matrix block is stored and processed in the GPU, the remaining portion may be stored (e.g., in RAM) and processed by a CPU of the host computing system, wherein an extra combination of the portions of the output vector of the GPU are added to the output from the portions in the host computing system.

Figure 4B:
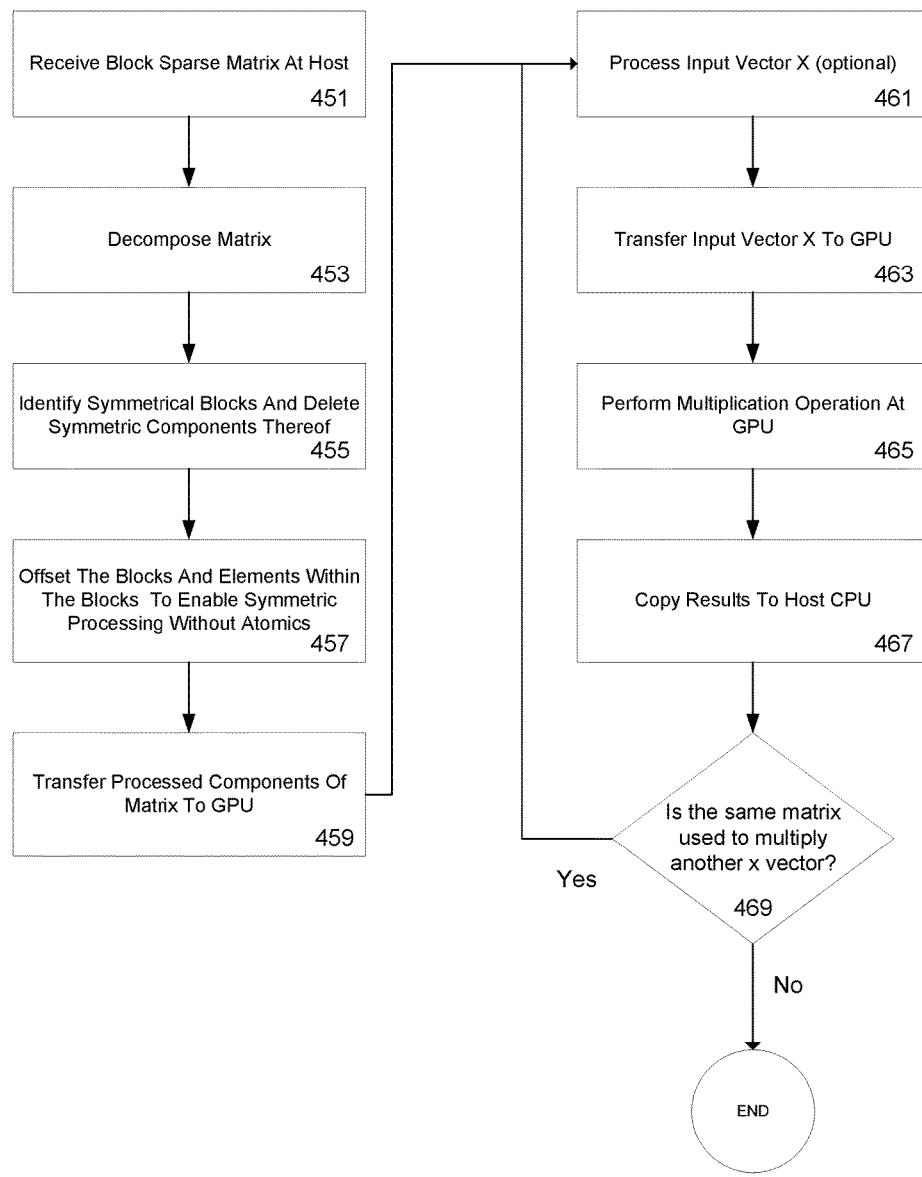
FIG. 4B depicts a flow diagram of an exemplary process for performing block sparse matrix vector multiplication, in accordance with various embodiments of the present invention.

With regard to FIG. 4B, a flow chart 450 of an exemplary process for performing block sparse matrix vector operations in a GPU is depicted according to embodiments of the present invention. Steps 451-467 of FIG. 4B describe exemplary steps of the flowchart 450 in accordance with the various embodiments herein described.

At step 451, a matrix A is received at a host device (e.g., a CPU). At step 453, the matrix is decomposed. For example, the input matrix A may be decomposed into components where each component contains only blocks of a specific width. The input matrix A may also be decomposed into component matrices were all sparse blocks were of equivalent size to make offsetting the blocks much easier. The decomposition is optionally performed on the host device. This decomposition is independent of the offsetting within and between blocks to leverage symmetry. At step 455, for each decomposed component of the matrix, identify which blocks can be treated symmetrically (e.g., blocks that are sufficiently close to the diagonal) and delete the symmetric component thereof. This step may be performed on the host or optionally on GPU.

At step 457, the blocks and elements within the blocks are offset to enable symmetric processing (multiplication) without the need for atomics. For example, some embodiments rearrange the x, y, and A data and store this data in a combination of registers and shared memory to minimize the amount of data needed to be stored/communicated, while also eliminating the need for atomics and maintaining maximum bandwidth (fully utilized cache lines, 'coalesced' memory access, etc.). Values can be re-arranged, for example, by skewing the data for matrix blocks processed concurrently in the same SM such that matrix blocks do not share column values corresponding to the same address in an output vector with other matrix blocks being concurrently processed. For symmetric matrix blocks, matrix blocks may be re-arranged such that they do not share row values with the transpose of a matrix block that is concurrently processed. According to one or more embodiments, the values in a matrix block of the block sparse matrix can be re-arranged by applying an increasing offset to each row of the matrix block, wherein the values in the row are shifted over by one or more columns. This step is performed on host or optionally on GPU.

At step 459, the processed components of matrix A are transferred to the GPU. Alternatively, a portion of the processed components of matrix A are transferred to the GPU if A is too large to fit on the GPU in its entirety. At step 461, input vector x is optionally processed. The structure of input vector x may be changed to ensure that every block begins on a 128 byte cache-line boundary, for example. At step 463, the (optionally processed) input vector x is transferred to the GPU. At step 465, block sparse matrix vector (BSpMV) multiplication operations are performed by the GPU. The operations may include adding the result y to components from shared memory and components from the registers, and the result is copied back to the host CPU at step 467. Subsequent to completing step 467, steps 461 to 467 are repeated if the same matrix is used to multiply multiple x vectors (469).

According to some embodiments, steps or portions of steps of the process depicted in FIG. 4B may be performed concurrently by the GPU. According to some embodiments, the process depicted in FIG. 4B is performed entirely by a CPU, where the CPU includes several CPU cores, each core having a small cache. According to further embodiments, the CPU includes multiple ARM cores.

Exemplary Computing System

As presented in FIG. 5, an exemplary system 500 upon which embodiments of the present invention may be implemented includes a general purpose computing system environment, such as the computing systems described above with respect to FIGS. 1 and 5, respectively. In its most basic configuration, computing system 500 typically includes at least one processing unit 501 and memory, and an address/data bus 509 (or other interface) for communicating information, but other busses, such as sysmem bus, PCIe bus, NVLINK, QPI, etc., may be included. Depending on the exact configuration and type of computing system environment, memory may be volatile (such as RAM 502), non-volatile (such as ROM 503, flash memory, etc.) or some combination of the two.

Computer system 500 may also comprise an optional graphics subsystem 505 for presenting information to the computer user, e.g., by displaying information on an attached display device 510. In one embodiment, the performance of the block sparse matrix vector multiplication described herein may be performed by graphics subsystem 505, alone or in conjunction with the processor 501 and memory 502, with any resulting output displayed in attached display device 510. In one or more embodiments, graphics subsystem 505 includes one or more SMs and a global memory, each SM including one or more SPs that process individual threads of a matrix block from the block sparse matrix.

Figure 5:
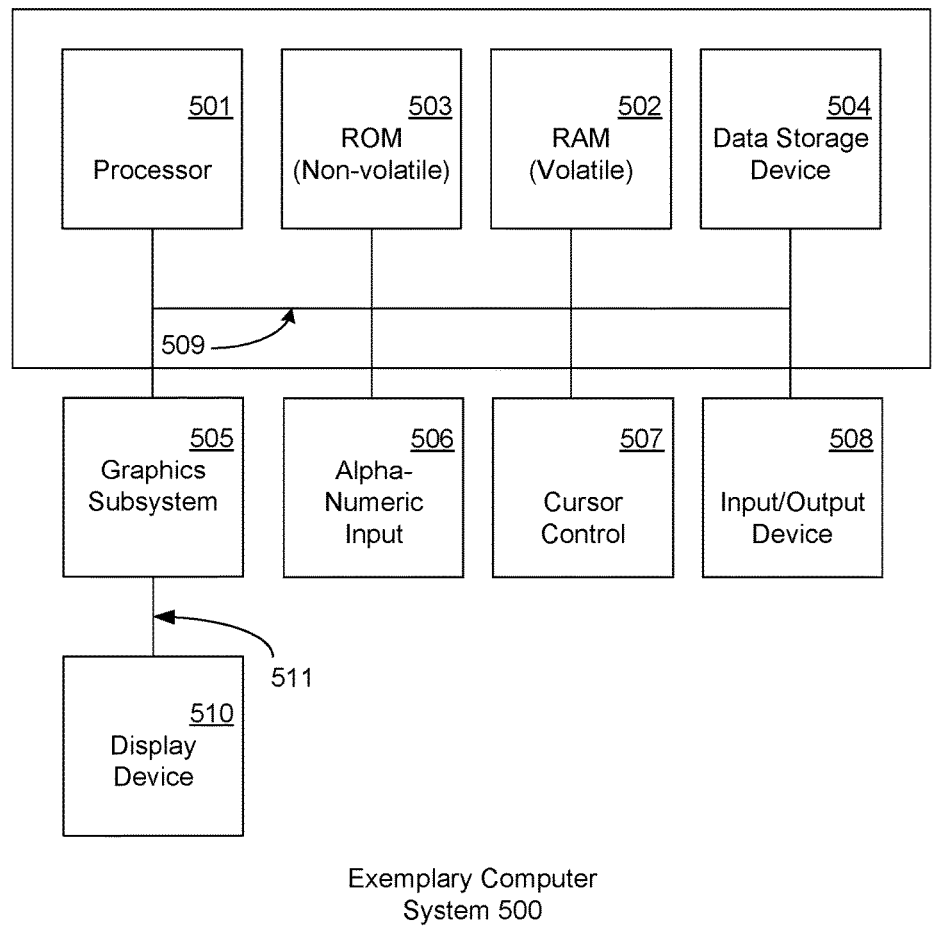
FIG. 5 depicts a block diagram of an exemplary computing system, in accordance with various embodiments of the present invention.
Figure 6:
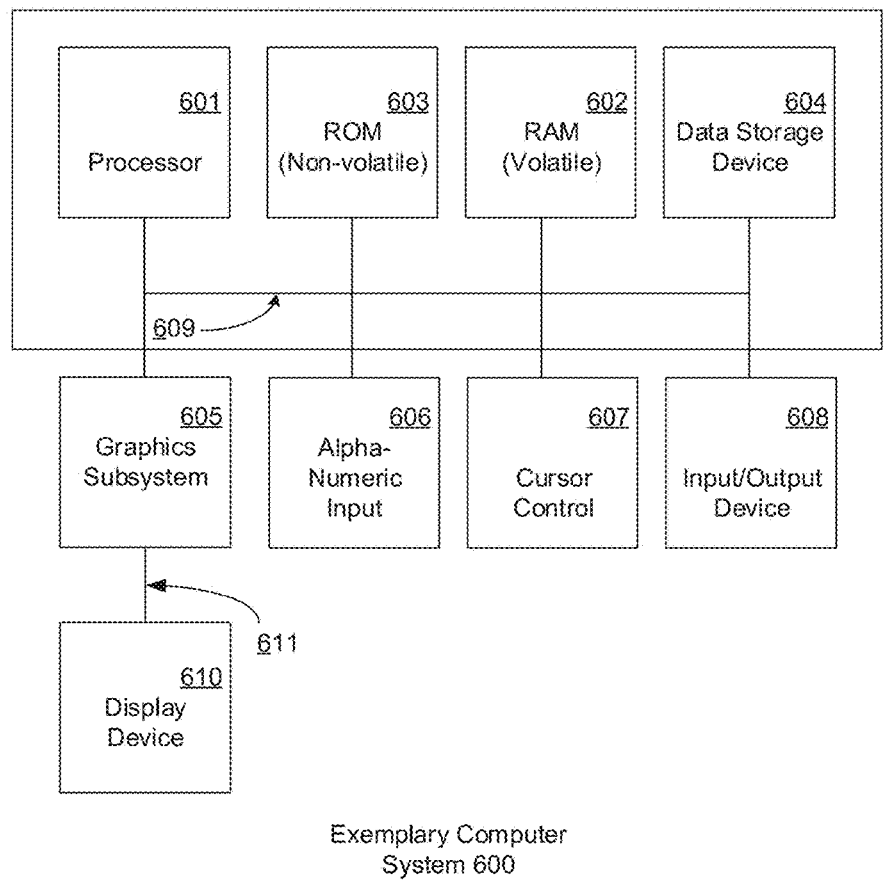

Additionally, computing system 500 may also have additional features/functionality. For example, computing system 500 may also include additional storage (removable and/or non-removable) including, but not limited to, magnetic or optical disks or tape. Such additional storage is illustrated in FIG. 5 by data storage device 507. Computer storage media includes volatile and nonvolatile, removable and non-removable media implemented in any method or technology for storage of information such as computer readable instructions, data structures, program modules or other data. RAM 502, ROM 503, and data storage device 507 are all examples of computer storage media.

Computer system 500 also comprises an optional alphanumeric input device 506, an optional cursor control or directing device 507, and one or more signal communication interfaces (input/output devices, e.g., a network interface card) 509. Optional alphanumeric input device 506 can communicate information and command selections to central processor 501. Optional cursor control or directing device 507 is coupled to bus 509 for communicating user input information and command selections to central processor 501. Signal communication interface (input/output device) 509, also coupled to bus 509, can be a serial port. Communication interface 509 may also include wireless communication mechanisms. Using communication interface 509, computer system 500 can be communicatively coupled to other computer systems over a communication network such as the Internet or an intranet (e.g., a local area network) to send and/or receive data.

Although the subject matter has been described in language specific to structural features and/or acts of one or more processes, it is to be understood that the subject matter defined in the appended claims is not necessarily limited to the specific features or acts described above. Rather, the specific features and acts described above are disclosed as example forms of implementing the claims.

What is claimed is:

1. A method for performing block sparse matrix calculations on a block sparse matrix, the method comprising:
   receiving, as input, a linear system represented by the block sparse matrix and an input vector, the block sparse matrix comprising a plurality of dense matrix blocks, wherein a symmetric portion of the block sparse matrix comprises the dense matrix blocks;
   re-arranging a plurality of values of the block sparse matrix such that for each column of a matrix block of each of the plurality of dense matrix blocks, each successive row of the dense matrix block is offset by a constant value from an immediately preceding row;
   re-arranging one or more of the re-arranged dense matrix blocks such that none of the plurality of re-arranged dense matrix blocks share row values with a transpose of a concurrently processed matrix block;
   responsive to the re-arranging, calculating a product of the block sparse matrix with the input vector in a plurality of streaming multi-processors (SMs) disposed in a GPU, wherein a matrix block of the plurality of dense matrix blocks is allocated to an SM of the plurality of SMs to be processed as a thread block by a plurality of stream processors (SPs) comprised in the SM; and
   storing the product in an output vector,
   wherein the output vector is distributed in a plurality of portions, a portion corresponding to an SM and being stored in registers and/or a shared memory corresponding to the SM.

2. The method according to claim 1, wherein each thread of the thread block is processed by a separate SP of the plurality of SPs.

3. The method according to claim 1, wherein the calculating comprises concurrently processing matrix blocks, of the plurality of matrix blocks, in the plurality of SMs.

4. The method according to claim 3, wherein concurrently processed matrix blocks do not share blocks from a common block column".

5. The method according to claim 3, wherein the calculating comprises concurrently processing a matrix block with a transpose of the matrix block.

6. The method according to claim 5, wherein elements of a column of the transpose update independent elements of an output vector y.

7. The method according to claim 1, wherein the block sparse matrix and the input vector are stored in a global memory of a graphics processing unit (GPU).

8. The method according to claim 1, wherein the calculating comprises storing an intermediate result in a vector comprised in a local register of an SM of the GPU.

9. A computing device, comprising:
   a graphics processing unit (GPU) comprising:
      a plurality of streaming multi-processors (SMs) configured to perform block sparse matrix vector multiplication (BSpMV) operations for a block sparse matrix and an input vector by concurrently processing a plurality of symmetric matrix blocks comprised in the block sparse matrix;
      a plurality of stream processors (SPs) disposed in each of the SMs and configured to process individual threads corresponding to the plurality of symmetric matrix blocks;
      a plurality of shared memory devices disposed in the plurality of SMs, a shared memory device of an SM being shared among the SPs disposed in the SM and configured to store a plurality of portions of an output vector corresponding to a product of the block sparse matrix and the input vector; and
   a global memory device operable to store the block sparse matrix and input vector.

10. The computing device of claim 9, further comprising a central processing unit (CPU) and an associated system memory (sysmem), wherein a portion of the block sparse matrix is stored in the associated system memory and a portion of the BSpMV operations corresponding to the portion of the block sparse matrix stored in the associated system memory is performed by the CPU.

11. The computing device of claim 10, wherein the portion of the BSpMV operations performed by the CPU is performed concurrently with BSpMV operations associated with a remaining portion of the block sparse matrix stored in the global memory device.

12. The computing device of claim 9, wherein the block sparse matrix is arranged as a plurality of symmetric matrix blocks skewed to avoid address collisions during concurrent memory accesses in a shared memory device of the plurality of shared memory devices.

13. The computing device of claim 12, where a matrix block is skewed to avoid collisions such that for each column of the matrix block, each successive row of the matrix block is offset by a constant value from an immediately preceding row.

14. The computing device of claim 9, wherein matrix blocks of the plurality of symmetric matrix blocks are allocated to the plurality of SMs as a plurality of thread blocks.

15. The computing device of claim 9, wherein matrix blocks of the plurality of symmetric matrix blocks processed concurrently by the same SM do not share a common column element.

16. The computing device of claim 9, wherein matrix blocks do not share a common row element with a transpose of a matrix block processed concurrently with the matrix blocks.

17. A non-transitory computer readable medium comprising a plurality of programmed instructions, which when executed by a processor in a computing device is operable to perform block sparse matrix calculations, the programmed instructions comprising:

instructions to receive, as input, a linear system represented as a block sparse matrix and an input vector, the block sparse matrix comprising a plurality of symmetric matrix blocks;

instructions to re-arrange a plurality of values of the block sparse matrix such that for each column of a matrix block of the plurality of symmetric matrix blocks, each successive row of the matrix block is offset by a constant value from an immediately preceding row;

instructions to calculate a product of the block sparse matrix with the input vector in a plurality of streaming multi-processors (SMs) disposed in a GPU, wherein the instructions to re-arrange comprise instructions to allocate a matrix block of the plurality of symmetric matrix blocks to an SM of the plurality of SMs to be processed as a thread block comprising a plurality of threads; and instructions to store the product in an output vector, wherein the output vector is distributed in a plurality of portions, a portion corresponding to an SM and being stored in registers and a shared memory corresponding to the SM.

18. The computer readable medium according to claim 17, wherein the SM comprises a plurality of stream processors (SPs).

19. The computer readable medium according to claim 18, wherein the instructions to calculate a product of the block sparse matrix comprises instructions to process each thread of the thread block with a separate SP of the plurality of SPs.

20. The computer readable medium according to claim 17, wherein the instructions to calculate a product of the block sparse matrix comprises instructions to concurrently process matrix blocks of the plurality of symmetric matrix blocks in the plurality of SMs.

21. The computer readable medium according to claim 20, wherein the instructions to concurrently process matrix blocks of the plurality of symmetric matrix blocks in the plurality of SMs comprises instructions to concurrently process matrix blocks that do not share a column of elements.

22. The computer readable medium according to claim 20, wherein the instructions to concurrently process matrix blocks of the plurality of symmetric matrix blocks in the plurality of SMs comprises instructions to concurrently process a transpose of a symmetric matrix block with the matrix blocks.

23. The computer readable medium according to claim 22, wherein instructions to concurrently process a transpose of a symmetric matrix block with the matrix blocks comprise instructions to concurrently process matrix blocks with a symmetric matrix block that do not share a row of elements.

24. The computer readable medium according to claim 17, wherein the instructions to re-arrange a plurality of values of the block sparse matrix comprise instructions to re-arrange the plurality of values of the block sparse matrix such that all elements of columns of both a non-transpose version and a transpose version of all the symmetric matrix blocks update independent elements of the output vector y.

* * * * *